(12) United States Patent
Dai et al.

(10) Patent No.: US 10,476,105 B2
(45) Date of Patent: Nov. 12, 2019

(54) SELF-HEALING GEL-TYPE ELECTROLYTE COMPOSITE

(71) Applicant: GM Global Technology Operations LLC, Detroit, MI (US)

(72) Inventors: Fang Dai, Troy, MI (US); Mahmoud Abd Elhamid, Troy, MI (US); Mei Cai, Bloomfield Hills, MI (US); Anne M. Dailly, West Bloomfield, MI (US); Robert M. Lapierre, Bloomfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 207 days.

(21) Appl. No.: 15/681,142

(22) Filed: Aug. 18, 2017

(65) Prior Publication Data

US 2019/0058215 A1 Feb. 21, 2019

(51) Int. Cl.
| | | |
|---|---|---|
| *H01M 10/0565* | (2010.01) | |
| *C01D 15/00* | (2006.01) | |
| *C08G 65/16* | (2006.01) | |
| *H01M 6/18* | (2006.01) | |
| *H01M 10/052* | (2010.01) | |
| *H01M 10/0567* | (2010.01) | |
| *H01M 10/0568* | (2010.01) | |

(52) U.S. Cl.
CPC ........ *H01M 10/0565* (2013.01); *C01D 15/00* (2013.01); *C08G 65/16* (2013.01); *H01M 6/181* (2013.01); *H01M 10/052* (2013.01); *H01M 10/0567* (2013.01); *H01M 10/0568* (2013.01); *H01M 2300/0085* (2013.01)

(58) Field of Classification Search
CPC .. H01M 10/0565; H01M 6/181; C01D 15/00; C08G 65/16
See application file for complete search history.

(56) References Cited

U.S. PATENT DOCUMENTS

| | | | | |
|---|---|---|---|---|
| 5,648,011 A | * | 7/1997 | Blonsky | H01M 6/181 |
| | | | | 252/62.2 |
| 6,436,583 B1 | * | 8/2002 | Mikhaylik | H01M 4/5815 |
| | | | | 429/324 |
| 2015/0044517 A1 | * | 2/2015 | Mikhaylik | H01M 4/366 |
| | | | | 429/49 |

* cited by examiner

*Primary Examiner* — Gregg Cantelmo
(74) *Attorney, Agent, or Firm* — Quinn IP Law

(57) ABSTRACT

Systems and methods of providing self-healing gel-type electrolyte composites for metal batteries are disclosed. According to aspects of the disclosure, a method includes preparing a ternary mixture including an electrolyte portion, a matrix precursor portion, and a self-healing portion, forming a self-healing gel-electrolyte membrane by initiating polymerization of the gel-forming precursor and the gel-forming initiator to thereby form a polymer matrix, and disposing the self-healing gel-electrolyte membrane between an anode and a cathode. The self-healing portion includes a self-healing precursor that is flowable and a self-healing initiator. The matrix precursor portion includes a gel-forming precursor and a gel-forming initiator. The electrolyte portion and the self-healing portion are disposed substantially throughout the polymer matrix and the polymer matrix includes a plurality of gel-forming active sites.

18 Claims, 2 Drawing Sheets

SELF-HEALING GEL-TYPE ELECTROLYTE COMPOSITE

The disclosure relates to the field of electrolytes for metal batteries and, more specifically, to systems and methods of providing self-healing gel-type electrolyte composites for metal batteries.

The lithium class of batteries, such as lithium-metal, lithium-ion, or lithium-sulfur batteries, has gained popularity for various reasons, including a relatively high energy density, a general nonappearance of any memory effect when compared to other kinds of rechargeable batteries, a relatively low internal resistance, and a low self-discharge rate when not in use. Lithium-class batteries may be used as primary, or non-rechargeable, batteries and secondary, or rechargeable, batteries.

Lithium-class batteries may be used in stationary and portable devices, such as those encountered in the consumer electronic, automobile, healthcare, and aerospace industries. In the automotive industry, lithium-based batteries may be suitable for electric-based vehicles, such as hybrid electric vehicles ("HEVs"), battery electric vehicles ("BEVs"), plug-in HEVs, and extended-range electric vehicles ("EREVs"). The ability of lithium batteries to undergo repeated power cycling over their useful lifetimes makes them an attractive and dependable power source.

SUMMARY

According to aspects of the present disclosure, a method includes preparing a ternary mixture including an electrolyte portion, a matrix precursor portion, and a self-healing portion, forming a self-healing gel-electrolyte membrane by initiating polymerization of the gel-forming precursor and the gel-forming initiator to thereby form a polymer matrix, and disposing the self-healing gel-electrolyte membrane between an anode and a cathode. The self-healing portion includes a self-healing precursor that is flowable and a self-healing initiator. The matrix precursor portion includes a gel-forming precursor and a gel-forming initiator. The electrolyte portion and the self-healing portion are disposed substantially throughout the polymer matrix. The polymer matrix includes a plurality of gel-forming active sites.

According to further aspects of the present disclosure, the self-healing precursor is a cyclic ether and the self-healing initiator is a lithium-containing compound.

According to further aspects of the present disclosure, the gel-forming precursor is a branched acrylate and the gel-forming initiator is a UV initiator.

According to further aspects of the present disclosure, the electrolyte portion is an organic electrolyte.

According to further aspects of the present disclosure, the self-healing precursor is a cyclic ether having the formula $CH_2OC_2H_4O$ and the self-healing initiator is lithium bis(fluorosulfonyl)imide ("LiFSI").

According to further aspects of the present disclosure, the gel-forming precursor is a branched acrylate having a functional moiety selected from the group consisting of a carboxylic acid and an ester and the gel-forming initiator is 1,1-diphenylmethanone.

According to further aspects of the present disclosure, the electrolyte portion includes a lithium-containing salt selected from the group consisting of lithium perchlorate ($LiClO_4$), lithium hexafluoroarsenate (V) ($LiAsF_6$), lithium hexafluorophosphate ($LiPF_6$), lithium tetrafluoroborate ($LiBF_4$), lithium bis(trifluoromethanesulfonyl)imide ($LiC_2F_6NO_4S_2$) ("LiTFSI"), and combinations thereof.

According to further aspects of the present disclosure, the method further includes applying the ternary mixture to a substrate prior to forming the self-healing gel-electrolyte membrane.

According to further aspects of the present disclosure, the substrate is selected from the group consisting of the anode, the cathode, and a separator.

According to further aspects of the present disclosure, the method further includes filling, in response to a fracture formed in the polymer matrix contacting the self-healing precursor, at least a portion of the fracture with the self-healing precursor, and polymerizing, in response to the self-healing precursor contacting the self-healing initiator, the self-healing precursor to thereby inhibit propagation of the fracture through the self-healing gel-electrolyte membrane.

According to further aspects of the present disclosure, the self-healing portion is present in the ternary mixture in an amount of two parts by weight based on ten parts by weight of the ternary mixture, the matrix precursor portion is present in the ternary mixture in an amount of two parts by weight based on ten parts by weight of the ternary mixture, and the electrolyte is present in the ternary mixture in an amount of six parts by weight based on ten parts by weight of the ternary mixture.

According to further aspects of the present disclosure, at least one of the anode and the cathode includes a binder, the binder formed from a binary mixture including the matrix precursor portion and the self-healing portion, the binder binding an active material therein, the active material being selected from the group consisting of lithium-containing materials and sulfur-containing materials.

According to further aspects of the present disclosure, at least one of the anode and the cathode is an active-lithium electrode and the self-healing gel-electrolyte membrane is a coating on the at least one of the anode and the cathode to thereby prevent precipitation of transition metals on the active-lithium electrode.

According to further aspects of the present disclosure, an active material of at least one of the anode and the cathode include sulfur and the self-healing gel-electrolyte membrane prevents electrical shorts between the anode and the cathode.

According to further aspects of the present disclosure, an active material of at least one of the anode and the cathode include sulfur and the self-healing gel-electrolyte membrane prevents polysulfide shuttling without lithium nitrate present between the anode and the cathode.

According to further aspects of the present disclosure, the anode is formed from a mixture including silicon particles, the self-healing portion and the matrix precursor portion and wherein, after polymerization of the matrix precursor portion, the silicon particles are encapsulated within the polymer matrix.

According to aspects of the present disclosure, a battery cell includes an anode, a cathode, and a self-healing membrane disposed between the anode and the cathode. The self-healing membrane is prepared by a process including preparing a ternary mixture including an electrolyte portion, a matrix precursor portion, and a self-healing portion and forming a self-healing gel-electrolyte membrane by initiating polymerization of the gel-forming precursor and the gel-forming initiator to thereby form a polymer matrix. The self-healing portion includes a self-healing precursor that is flowable and a self-healing initiator. The matrix precursor portion includes a gel-forming precursor and a gel-forming initiator. The electrolyte portion and the self-healing portion are disposed substantially throughout the polymer matrix.

The polymer matrix includes a plurality of gel-forming active sites. According to further aspects of the present disclosure, the process further includes applying the ternary mixture to a substrate prior to forming the self-healing gel-electrolyte membrane.

According to further aspects of the present disclosure, the self-healing precursor, in response to contact with a fracture in the self-healing gel-electrolyte membrane, fills at least a portion of the fracture, and the self-healing precursor, in response to contact with the self-healing initiator, polymerizes to thereby inhibit propagation of the fracture.

According to further aspects of the present disclosure, the self-healing precursor is a cyclic ether and the self-healing initiator is a lithium-containing compound.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
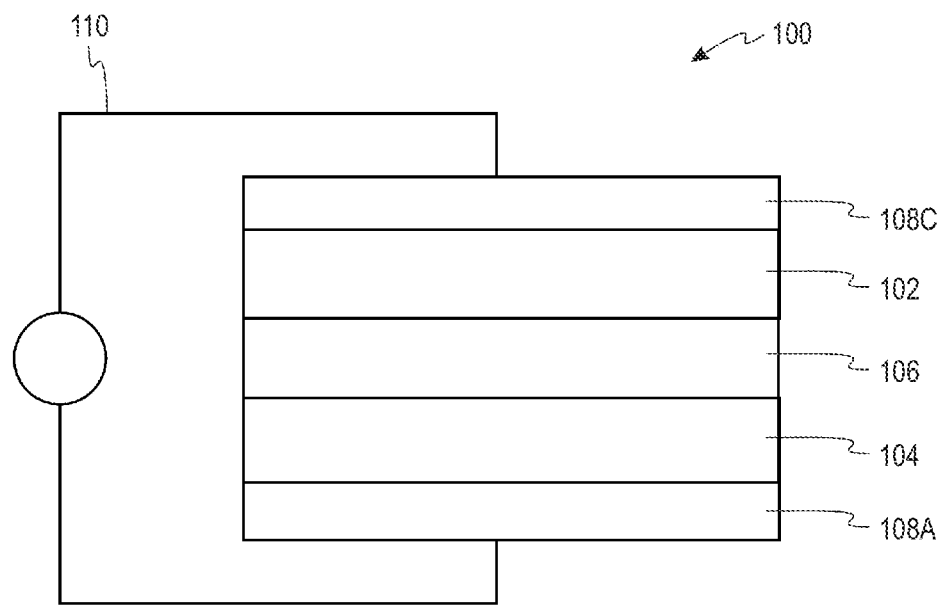
FIG. 1 illustrates a schematic battery cell having a self-healing gel-electrolyte membrane, according to aspects of the present disclosure.

FIG. 1 illustrates a schematic battery cell 100. The battery cell 100 includes a cathode 102, an anode 104, and a self-healing gel-electrolyte membrane 106 disposed between the cathode 102 and the anode 104. In some aspects, the anode 104 is a lithium-class anode. For example, active material of the anode 104 may include intercalated lithium. In some aspects, the active material of the anode 104 is a lithium-sulfide anode, such as those provided by U.S. Patent Publication No. 2015/0221935 to Zhou and U.S. Patent Publication No. 2015/0162583 to Dadheech, each of which is hereby incorporated by reference in its entirety. The active material of the cathode 102 is selected to facilitate an electrochemical reaction of the anode 104. In some aspects, the active material of the cathode 102 is copper. In some aspects, the active material of the cathode 104 is a sulfur-containing material.

Beneficially, the self-healing gel-electrolyte membrane 106 may improve operable lifetime of battery packs implementing the battery cells 100 by inhibiting dendrite formation in lithium-metal batteries and polysulfide shuttling in lithium-sulfur batteries. Further, the self-healing gel-electrolyte membrane 106 may additionally inhibit thermal runaway events resulting from, for example, a puncture to the battery cell 100. Moreover, the self-healing gel-electrolyte membrane 106 disclosed herein may reduce manufacturing costs of the battery cell 100 by avoiding costs of metal catalyst initiators such as rare metal catalysts. Additionally, the self-healing gel-electrolyte membrane 106 disclosed herein may be implemented as a binder for the anode 104 and cathode 102 in lithium batteries. What is more, the self-healing gel-electrolyte membrane 106 may also be implemented as a coating for active electrodes such as the anode 104 to prevent transition-metal deposition when using a cathode 102 based on transition-metal oxides. Moreover, the self-healing gel-electrolyte membrane 106 could be used as a coating in power cells to prevent self-discharge due to the reaction of, for example, active lithium titanate ("LTO"), which may be used as an anode material with the electrolyte. The self-healing gel-electrolyte membrane 106 may also be used to form a shell around silicon particles used in high-energy-density lithium batteries that use silicon as an active material for the anode 104.

In some aspects, the battery cell 100 further includes an anode-side current collector 108A and a cathode-side current collector 108C. The anode-side current collector 108A may be disposed adjacent the anode 104 and may be configured to balance current distribution and increase charge transfer across the anode 104. The cathode-side current collector 108C may be disposed adjacent the cathode 102 and may be configured to balance current distribution and increase charge transfer across the cathode 102. An external circuit 110 may electrically couple the anode-side current collector 108A to the cathode-side current collector 108C. The external circuit 110 may allow current to flow between the anode-side current collector 108A and the cathode-side current collector 108C.

The self-healing gel-electrolyte membrane 106 is formed from a ternary mixture that includes an electrolyte portion, a matrix precursor portion, and a self-healing portion. The electrolyte portion is configured to allow for ionic transfer between the cathode 102 and anode 104. In some aspects, the electrolyte portion is an organic electrolyte, such as a lithium-containing salt in an organic solvent. In some aspects, the lithium-containing salt is selected from the group consisting of lithium perchlorate ($LiClO_4$), lithium hexafluoroarsenate ($LiAsF_6$), lithium hexafluorophosphate ($LiPF_6$), lithium tetrafluoroborate ($LiBF_4$), lithium bis(trifluoromethanesulfonyl)imide ($LiC_2F_6NO_4S_2$) ("LiTFSI"), combinations thereof, and the like. In some aspects, the organic solvent or cosolvent is a carbonate-group solvent. For example, the organic solvent or cosolvent may be ethylene carbonate (($CH_2O)_2CO$), propylene carbonate ($CH_3C_2H_3O_2CO$), diethyl carbonate ($OC(OCH_2CH_3)_2$), combinations thereof, and the like.

The matrix precursor portion is configured to form a polymer matrix that defines a structure of the self-healing gel-electrolyte membrane 106. The matrix precursor portion includes a gel-forming precursor and a gel-forming initiator. The gel-forming precursor is configured to form the polymer of the polymer matrix. In some aspects, the gel-forming precursor is a branched precursor. In some aspects, the gel-forming precursor is a branched acrylate having a functional moiety selected from the group consisting of a carboxylic acid and an ester.

The gel-forming initiator is configured to initiate polymerization of the gel-forming precursor in response to reaching predetermined physical conditions. In some aspects, the gel-forming initiator is a UV initiator that initiates polymerization of the gel-forming precursor in response to being exposed to UV light. For example, the gel-forming initiator may be 1,1-diphenylmethanone. Beneficially, UV initiators provide for polymerization of the gel-forming precursor that may be quickly initiated or halted. In some aspects, the gel-forming initiator is a thermal initiator that initiates polymerization of the gel-forming precursor in response to being exposed to elevated temperatures. Beneficially, thermal initiators may be used to provide for polymerization of the gel-forming precursor when disposed inside of a product or when a view of the gel-forming precursor is obscured.

The self-healing portion includes a self-healing precursor and a self-healing initiator. The self-healing portion is dispersed in the self-healing gel-electrolyte membrane 106 such that a fracture in the self-healing gel-electrolyte membrane 106 will contact the self-healing precursor and the self-healing initiator. The self-healing precursor and the self-healing initiator are selected to inhibit propagation of a fracture through the polymer matrix after contact between the self-healing precursor and the self-healing initiator. The self-healing precursor and/or the self-healing initiator are maintained within deposits throughout the polymer matrix. In some aspects, the deposits are within well-defined containment structures such as microspheres or tubular structures having a relatively uniform size distribution. In some aspects, the deposits of the self-healing precursor and/or the self-healing initiator are formed because the self-healing precursor and/or self-healing initiator are contained within well-defined containment structures formed by a separate encapsulant. In some aspects, the deposits of the self-healing precursor and/or the self-healing initiator are formed because the self-healing precursor and/or the self-healing initiator are immiscible within the ternary mixture.

As a fracture propagates through the polymer matrix, the fracture will contact the self-healing precursor. The self-healing precursor is configured to be flowable such that, in response to contact with the fracture in the self-healing gel-electrolyte membrane 106, the self-healing precursor fills at least a portion of the fracture. Further, the self-healing precursor is configured to polymerize in response to contact with the self-healing initiator to thereby inhibit propagation of the fracture. The distribution and amount of self-healing precursor within the polymer matrix are selected to inhibit fractures from propagating further than a certain average distance. For example, an increased load of the self-healing precursor reduces the statistical distance a fracture may propagate through the self-healing gel-electrolyte membrane 106 before the fracture would contact a deposit of the self-healing precursor.

In some aspects, the self-healing portion is substantially uniformly distributed throughout the polymer matrix. In some aspects, the self-healing portion is loaded more heavily toward the edges of the polymer matrix that face the cathode 102 or the anode 104. Beneficially, such a non-uniform distribution may inhibit propagation of fractures from the edges of the self-healing gel-electrolyte membrane 106 while reducing the overall amount of self-healing portion required to inhibit fracture propagation.

In some aspects, the self-healing precursor is selected such that the self-healing precursor and polymers formed therefrom may attach to gel-forming active sites within the polymer matrix. Beneficially, such an attachment may increase the strength of the self-healed portion and provide greater resistance against further propagation.

In some aspects, the self-healing precursor is selected to polymerize through a cationic ring-opening polymerization process. In some aspects, the self-healing precursor is a cyclic molecule capable of polymerization. In some aspects, the self-healing precursor is a cyclic ether. In some aspects, the self-healing precursor is cyclic ether having the formula $CH_2OC_2H_4O$.

In some aspects, the self-healing initiator is a lithium-containing compound. In some aspects, the self-healing initiator is flowable such that, upon contact with the fracture, the self-healing initiator fills at least a portion of the fracture. Beneficially, a flowable self-healing initiator may increase the rate of polymerization through increased mixing with the self-healing precursor. In some aspects, the self-healing initiator is a lithium imide compound. In some aspects, the self-healing initiator is lithium bis(fluorosulfonyl)imide. In some aspects, the self-healing precursor is contained within an inert microcapsule and the self-healing initiator is a component within the electrolyte portion.

Figure 2:
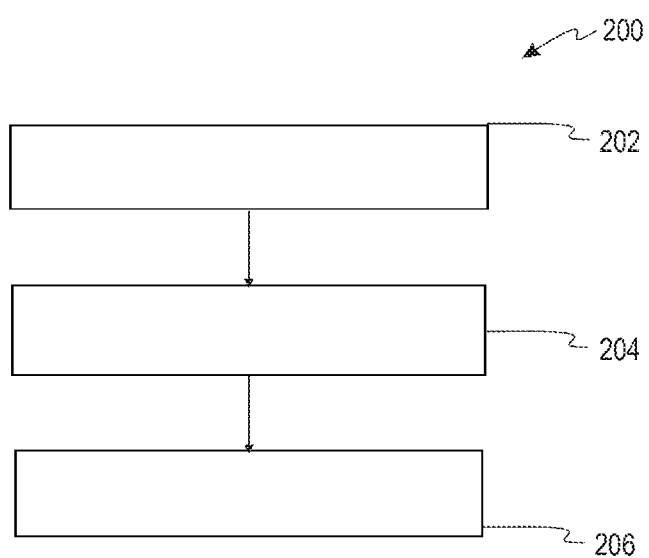
FIG. 2 illustrates a schematic method according to aspects of the present disclosure.

Referring now to FIG. 2, a method 200 of providing a self-healing gel-electrolyte membrane 106 for a battery cell 100 is shown. The method 200 includes preparing 202 a ternary mixture including the electrolyte portion, the matrix precursor portion, and the self-healing portion, forming 204 the self-healing gel-electrolyte membrane 106 by initiating polymerization of the gel-forming precursor and the gel-forming initiator, and disposing 206 the self-healing gel-electrolyte membrane 106 between the cathode 102 and the anode 104.

The self-healing portion includes a self-healing precursor that is flowable and a self-healing initiator. The matrix precursor portion includes a gel-forming precursor and a gel-forming initiator. Initiating polymerization of the gel-forming precursor and the gel-forming initiator thereby forms a polymer matrix. The electrolyte portion and the self-healing portion are substantially throughout the polymer matrix. The polymer matrix includes a plurality of gel-forming active sites.

In some aspects, the ternary mixture is prepared by mixing the electrolyte portion, the matrix precursor portion, and the self-healing portion together in solution. In some aspects, the self-healing portion is added to a mixture of the electrolyte portion and the matrix precursor portion immediately prior to initiating curing of the matrix precursor portion to inhibit polymerization of the self-healing precursor. In some aspects, the electrolyte portion, the matrix precursor portion, and one of the self-healing precursor and the self-healing initiator are mixed together while the other of the self-healing precursor and the self-healing initiator is added to the mixture immediately prior to initiating curing of the matrix precursor portion to inhibit polymerization of the self-healing precursor.

The ternary mixture may be applied to a substrate prior to forming the self-healing gel-electrolyte membrane 106. In some aspects, the substrate is a removable backer. For example, the ternary mixture may be deposited onto the removable backer for curing of the polymer matrix. After polymerization of the matrix precursor has proceeded to a predetermined extent that the self-healing gel-electrolyte membrane 106 is freestanding and manipulatable without damage, the removable backer is separated from the self-healing gel-electrolyte membrane 106. The self-healing gel-electrolyte membrane 106 may then be placed between the anode and the cathode of the battery cell. Placement of the self-healing gel-electrolyte membrane 106 may be achieved through abutting the self-healing gel-electrolyte membrane 106 with one or more of the anode or the cathode.

In some aspects, the substrate is selected from the group consisting of the anode 104, the cathode 102, and the separator. For example, the ternary mixture may be deposited onto the cathode 102 for curing of the polymer matrix. In some aspects, another battery component, such as the anode 104 or the separator, is applied to the ternary mixture opposite the cathode prior to curing of the polymer matrix. In some aspects, another battery component, such as the anode or the separator, is applied to the ternary mixture after polymerization of the polymer matrix has proceeded to a predetermined extent that the self-healing gel-electrolyte membrane 106 is freestanding and manipulatable without damage.

In some aspects, at least one of the anode 104 and the cathode 102 includes a binder which binds an active material therein. The binder may be formed from a binary mixture including the matrix precursor portion and the self-healing portion. In some aspects, the active material is selected from the group consisting of lithium-containing materials and sulfur-containing materials.

In some aspects, at least one of the anode 104 and the cathode 102 is an active-lithium electrode and the self-healing gel-electrolyte membrane is a coating on the at least one of the anode 104 and the cathode 102 to thereby prevent precipitation of transition metals on the active-lithium electrode.

In some aspects, the active material of at least one of the anode 104 and the cathode 102 includes sulfur and the self-healing gel-electrolyte membrane prevents electrical shorts between the anode 104 and the cathode 102.

In some aspects, the active material of at least one of the anode 104 and the cathode 102 include sulfur and the self-healing gel-electrolyte membrane prevents polysulfide shuttling without lithium nitrate present between the anode 104 and the cathode 102.

In some aspects, the anode 104 is formed from a mixture including silicon particles, the self-healing portion, and the matrix precursor portion. After polymerization of the matrix precursor portion for the anode 104, the silicon particles are encapsulated within the polymer matrix. Beneficially, the self-healing portion within the polymer matrix prevents damage to the polymer matrix from thermal expansion and contraction of the silicon particles.

For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

While the best modes for carrying out the disclosure have been described in detail, those familiar with the art to which this disclosure relates will recognize various alternative designs and embodiments for practicing the disclosure within the scope of the appended claims.

EXAMPLES

Example 1

A self-healing gel-electrolyte membrane is formed from a ternary mixture of an electrolyte portion, a matrix precursor portion, and a self-healing portion. The self-healing portion includes a self-healing precursor that is a cyclic ether having the formula $CH_2OC_2H_4O$ and a self-healing initiator that is lithium bis(fluorosulfonyl)imide. The matrix precursor portion includes a gel-forming precursor of a branched acrylate having a carboxylic acid as the functional moiety and a gel-forming initiator of 1,1-diphenylmethanone. The electrolyte portion is an organic electrolyte including lithium hexafluorophosphate in a cosolvent combination of ethylene carbonate and dimethyl carbonate, the ethylene carbonate being 50% by volume on a basis of the cosolvents and the dimethyl carbonate being 50% by volume on a basis of the cosolvents. The electrolyte portion is 60 percent by weight on a basis of the total weight of the ternary mixture. The matrix precursor portion is 20 percent by weight on a basis of the total weight of the ternary mixture. The self-healing portion is 20 percent by weight on a basis of the total weight of the ternary mixture.

The battery cell is a half-cell configuration of a lithium anode, a liquid electrolyte layer, a self-healing gel-electrolyte membrane, and a copper cathode. The lithium anode is adjacent the liquid electrolyte layer. The liquid electrolyte layer is disposed between the lithium anode and the self-healing gel-electrolyte membrane. The self-healing gel-electrolyte membrane is disposed between the liquid electrolyte layer and the copper cathode. The composition of the liquid electrolyte layer is 1 molar lithium hexafluorophosphate in ethylene carbonate and dimethyl carbonate, the ethylene carbonate being 50% by volume on a basis of the cosolvents and the dimethyl carbonate being 50% by volume on a basis of the cosolvents.

Figure 3:
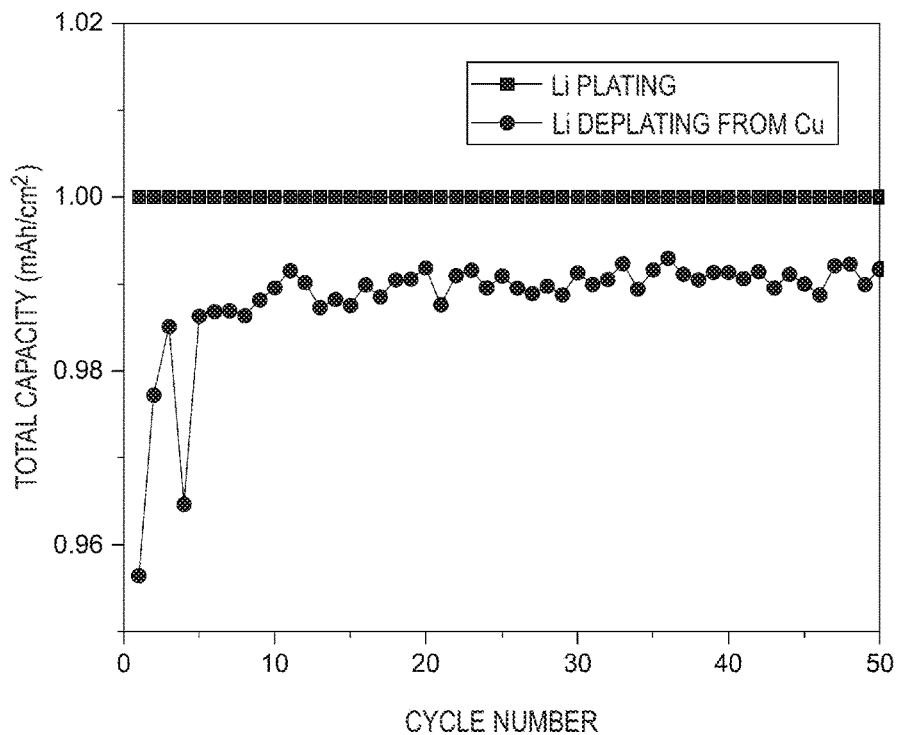
FIG. 3 illustrates a schematic plot of total capacitance by cycle number for an example battery cell 1

After assembly, the battery cell is tested for total capacity over charge-discharge cycles. The charge cycle is run to 1 $mAh/cm^2$ at a rate of 0.25 $mA/cm^2$ and the discharge cycle is run at a rate of 0.25 $mA/cm^2$. FIG. 3 is a plot of total capacity for each cycle obtained. As can be seen, the total capacity has an initial coulombic efficiency of less than 96%. As the cycles increase, the coulombic efficiency increases to greater than 99%.

Example 2

A self-healing gel-electrolyte membrane is formed from a ternary mixture of an electrolyte portion, a matrix precursor portion, and a self-healing portion. The self-healing portion includes a self-healing precursor that is a cyclic ether having the formula $CH_2OC_2H_4O$ and a self-healing initiator that is lithium bis(fluorosulfonyl)imide. The matrix precursor portion includes a gel-forming precursor of a branched acrylate having a carboxylic acid as the functional moiety and a gel-forming initiator of 1,1-diphenylmethanone. The electrolyte portion is an organic electrolyte including lithium hexafluorophosphate in a cosolvent combination of ethylene carbonate and dimethyl carbonate, the ethylene carbonate being 50% by volume on a basis of the cosolvents and the dimethyl carbonate being 50% by volume on a basis of the cosolvents. The electrolyte portion is 60 percent by weight on a basis of the total weight of the ternary mixture. The matrix precursor portion is 20 percent by weight on a basis of the total weight of the ternary mixture. The self-healing portion is 20 percent by weight on a basis of the total weight of the ternary mixture.

The battery cell is a half-cell configuration of a lithium anode, a self-healing gel-electrolyte membrane, a liquid electrolyte layer, and a sulfur-containing cathode. The lithium anode is adjacent the self-healing gel-electrolyte membrane. The self-healing gel-electrolyte membrane is disposed between the lithium anode and the liquid electrolyte layer. The liquid electrolyte layer is disposed between the self-healing gel-electrolyte membrane and the copper cathode. The composition of the liquid electrolyte layer is 1 molar LiTFSI in 1,3-dioxolane ("DOL") and 1,2-dimethoxyethane ("DME"), the DOL being 50% by volume on a basis of the cosolvents and the DME being 50% by volume on a basis of the cosolvents. Notably, the battery cell of this example does not include lithium nitrate ($LiNO_3$). Beneficially, the self-healing gel-electrolyte membrane inhibits overcharge conditions caused by polysulfide redox shutting without additional inhibitors such as lithium nitrate. For example, a similar lithium-sulfur battery lacking both a self-healing gel-electrolyte membrane and lithium nitrate suffers from polysulfide shuttling and overcharge until the electrolyte dries out while the example battery cell continued to function and did not show effects of polysulfide shuttling.

Figure 4:
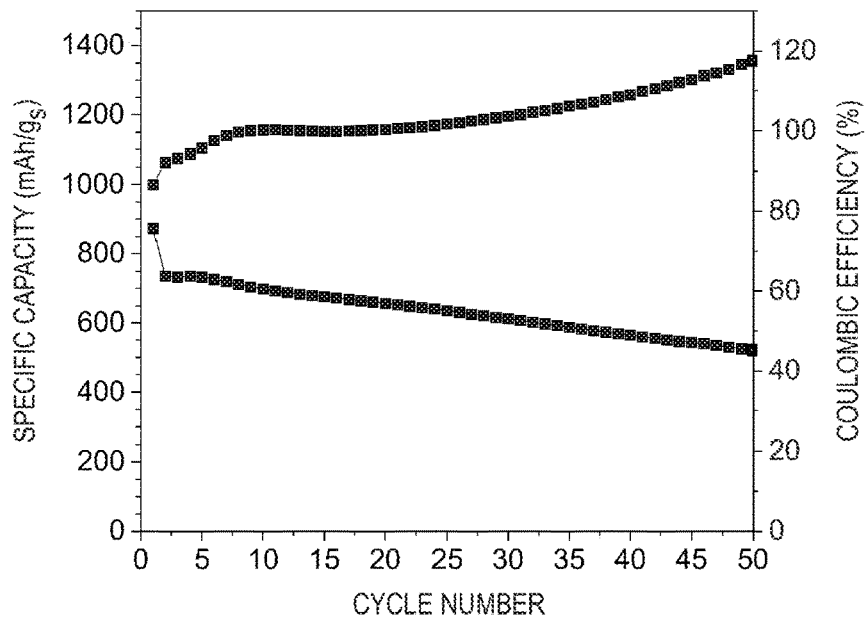
FIG. 4 illustrates a schematic plot of specific capacity and coulombic efficiency by cycle number for another example battery cell.

After assembly, the battery cell is tested for total capacity over charge-discharge cycles. The charge cycle is run to 1 mAh/cm$^2$ at a rate of 0.25 mA/cm$^2$ and the discharge cycle is run at a rate of 0.25 mA/cm$^2$. FIG. 4 is a plot of specific capacity and coulombic efficiency by cycle number. As can be seen, a coulombic efficiency of greater than 99% was reached after a few cycles with a specific capacity of about 900 mAh/g.

What is claimed is:

1. A method comprising:
    preparing a mixture including an electrolyte portion and a matrix precursor portion, the matrix precursor portion including a gel-forming precursor and a gel-forming initiator, the gel-forming precursor being a branched acrylate, wherein the mixture is a ternary mixture further comprising a self-healing portion, the self-healing portion including a self-healing precursor that is flowable and a self-healing initiator;
    forming a self-healing gel-electrolyte membrane by initiating polymerization of the gel-forming precursor and the gel-forming initiator to thereby form a polymer matrix, the electrolyte portion disposed substantially throughout the polymer matrix, the polymer matrix including a plurality of gel-forming active sites, wherein the self-healing portion is disposed substantially throughout the polymer matrix; and
    disposing the self-healing gel-electrolyte membrane between an anode and a cathode.

2. The method of claim 1, wherein the branched acrylate includes a functional moiety selected from the group consisting of a carboxylic acid and an ester and the gel-forming initiator is 1,1-diphenylmethanone.

3. The method of claim 2, wherein the electrolyte portion includes a lithium-containing salt selected from the group consisting of lithium perchlorate (LiClO$_4$), lithium hexafluoroarsenate (V) (LiAsF$_6$), lithium hexafluorophosphate (LiPF$_6$), lithium tetrafluoroborate (LiBF$_4$), lithium bis(trifluoromethanesulfonyl)imide (LiC$_2$F$_6$NO$_4$S$_2$) ("LiTFSI"), and combinations thereof.

4. The method of claim 1, further comprising applying the mixture to a substrate prior to forming the self-healing gel-electrolyte membrane.

5. The method of claim 4, wherein the substrate is selected from the group consisting of the anode, the cathode, and a separator.

6. The method of claim 1, wherein the self-healing precursor is a cyclic ether and the self-healing initiator is a lithium-containing compound.

7. The method of claim 6, wherein the electrolyte portion is an organic electrolyte.

8. The method of claim 1, wherein the self-healing precursor is a cyclic ether having the formula CH$_2$OC$_2$H$_4$O and the self-healing initiator is lithium bis(fluorosulfonyl) imide.

9. The method of claim 1, further comprising:
    filling, in response to a fracture formed in the polymer matrix contacting the self-healing precursor, at least a portion of the fracture with the self-healing precursor; and
    polymerizing, in response to the self-healing precursor contacting the self-healing initiator, the self-healing precursor to thereby inhibit propagation of the fracture through the self-healing gel-electrolyte membrane.

10. The method of claim 1, wherein the self-healing portion is present in the ternary mixture in an amount of two parts by weight based on ten parts by weight of the ternary mixture, the matrix precursor portion is present in the ternary mixture in an amount of two parts by weight based on ten parts by weight of the ternary mixture, and the electrolyte portion is present in the ternary mixture in an amount of six parts by weight based on ten parts by weight of the ternary mixture.

11. The method of claim 1, wherein at least one of the anode and the cathode includes a binder, the binder formed from a binary mixture including the matrix precursor portion and a self-healing portion, the binder binding an active material therein, the active material being selected from the group consisting of lithium-containing materials and sulfur-containing materials.

12. The method of claim 1, wherein an active material of the cathode includes sulfur and the self-healing gel-electrolyte membrane prevents electrical shorts between the anode and the cathode.

13. The method of claim 1, wherein an active material of the cathode includes sulfur and the self-healing gel-electrolyte membrane prevents polysulfide shuttling without lithium nitrate present.

14. The method of claim 1, wherein the anode is formed from a second mixture including silicon particles, a self-healing portion and the matrix precursor portion and wherein, after polymerization of the matrix precursor portion, the silicon particles are encapsulated within the polymer matrix.

15. A battery cell comprising:
    an anode;
    a cathode; and
    a self-healing gel-electrolyte membrane disposed between the anode and the cathode, the self-healing membrane prepared by a process including:
        preparing a mixture including a matrix precursor portion and an electrolyte portion, the matrix precursor portion including a gel-forming precursor and a gel-forming initiator, the gel-forming portion being a branched acrylate, wherein the mixture is a ternary mixture further comprising a self-healing portion, the self-healing portion including a self-healing precursor that is flowable and a self-healing initiator; and
        forming the self-healing gel-electrolyte membrane by triggering polymerization of the gel-forming precursor and the gel-forming initiator to thereby form a polymer matrix, the polymer matrix including the electrolyte portion disposed substantially throughout the polymer matrix, the polymer matrix including a plurality of gel-forming active sites, wherein the self-healing portion is disposed substantially throughout the polymer matrix.

16. The battery cell of claim 15, wherein the process further includes applying the mixture to a substrate prior to forming the self-healing gel-electrolyte membrane.

17. The battery cell of claim 15, wherein the self-healing precursor is configured to, in response to contact with a fracture in the self-healing gel-electrolyte membrane, fill at least a portion of the fracture, and the self-healing precursor is further configured to, in response to contact with the self-healing initiator, polymerize to thereby inhibit propagation of the fracture.

18. The battery cell of claim 15, wherein the self-healing precursor is a cyclic ether and the self-healing initiator is a lithium-containing compound.

* * * * *